(12) United States Patent
Park

(10) Patent No.: US 6,947,116 B1
(45) Date of Patent: Sep. 20, 2005

(54) METHOD OF MANUFACTURING A LIQUID CRYSTAL DEVICE TO PREVENT NON-UNIFORM ILLUMINANCE

(75) Inventor: Jong Wook Park, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/419,620

(22) Filed: Oct. 15, 1999

(30) Foreign Application Priority Data

Oct. 16, 1998 (KR) .................................. 98-43305

(51) Int. Cl.[7] .................. G02F 1/13; G02F 1/1337; G02F 1/1333
(52) U.S. Cl. .................. 349/187; 349/123; 349/161
(58) Field of Search .................. 349/161, 123–126, 349/187

(56) References Cited

U.S. PATENT DOCUMENTS

| | | | |
|---|---|---|---|
| 5,460,748 A | * | 10/1995 | Mazaki et al. ......... 252/299.01 |
| 5,954,999 A | * | 9/1999 | Mishina et al. ......... 252/259.4 |
| 5,986,736 A | * | 11/1999 | Kodera et al. ......... 349/134 |
| 6,217,793 B1 | * | 4/2001 | Totani et al. ......... 252/299.62 |
| 6,295,112 B1 | * | 9/2001 | Kabe et al. ......... 349/126 |

FOREIGN PATENT DOCUMENTS

| | | |
|---|---|---|
| JP | 62165604 | 7/1987 |
| JP | 1120536 | 5/1989 |
| JP | 5323324 | 12/1993 |

* cited by examiner

Primary Examiner—Dung T. Nguyen
(74) Attorney, Agent, or Firm—Birch, Stewart, Kolasch & Birch, LLP

(57) ABSTRACT

A method of manufacturing a liquid crystal display includes forming a liquid crystal cell having first and second substrates, at least one alignment layer disposed on one of the first and second substrates and liquid crystal material disposed between the first and second substrates. Then, the liquid crystal cell is heated and then quickly cooled so as to prevent non-uniform illuminance from occurring in the display.

15 Claims, 4 Drawing Sheets

METHOD OF MANUFACTURING A LIQUID CRYSTAL DEVICE TO PREVENT NON-UNIFORM ILLUMINANCE

This application claims the benefit of Korean Application No. 1998-43305 filed on Oct. 16, 1999, which is hereby incorporated by reference.

BACKGROUND OF THE INVENTION

1. Field of the Invention

The present invention relates to a liquid crystal display device and more specifically, to a method of manufacturing a liquid crystal display device such that a non-uniform alignment in an alignment layer is corrected to prevent the occurrence of non-uniform illuminance in the display.

2. Discussion of the Related Art

A liquid crystal display (LCD) apparatus is widely used as a display for notebook computers and portable TVs. An LCD generally includes an upper substrate, a lower substrate, a liquid crystal layer between the two substrates, and an upper alignment layer coated on the inner surface of the upper substrate, and a lower alignment layer coated on the inner surface of the lower substrate. The upper and lower alignment layers are provided with a desired alignment direction via a rubbing process, and a ground alignment state of the liquid crystal layer is determined by the alignment direction. However, after injection of the liquid crystal at room temperature, the effect of the flow of the liquid crystal is fixed in the injected liquid crystal layer, thus changing the desired alignment orientation.

The conventional solution to this problem is to use an aging process in which the liquid crystal cell is heated at a temperature higher than a nematic-isotropic transition temperature Tni. More specifically, the liquid crystal cell is heated while in an isotropic phase at a temperature greater than Tni. This process is called aging process, the aging temperature is 100. Thereafter, the liquid crystal cell is slowly cooled at room temperature while in the isotropic phase so that nucleation is initiated in the liquid crystal molecules that are adjacent to the surface of the substrate. This causes the liquid crystal molecules to be aligned in the desired alignment directions.

However, when the alignment layer is dried and baked after being coated on the substrate, non-uniform tilt angles occur in the alignment layer, which is caused by the non-uniform temperature distribution therein during drying and baking. Additionally, non-uniform tilt angles may also occur locally in the alignment layer if the rubbing process is performed incorrectly after baking of the alignment layer. Further, the alignment layer can be damaged by the injection of the liquid crystal after the rubbing process so that local non-uniformities in alignment may still occur in the alignment layer.

FIG. 1 is a cross-sectional view showing liquid crystal molecules 2 adjacent to a surface of the alignment layer 1, where region A indicates an abnormally aligned region having an improper alignment, and region B indicates a normally aligned region having the proper alignment. As shown in FIG. 1, the abnormally aligned region A and the normally aligned region B have liquid crystal molecules aligned with different tilt angles. Note that the tilt angles shown in FIG. 1 are exaggerated for easier explanation. The normally aligned region B generally has a tilt angle in the range of 4 to 5 degrees.

FIG. 2 is a graph which shows the transmittance T as a function of the driving voltage V in the abnormally aligned region A and the normally aligned region B. This graph shows the transmittance or illuminance difference X between abnormally aligned region A and the normally aligned region B at a grey level voltage Vg. This local non-uniform illuminance is caused by the non-uniform alignment in the alignment layer, thus, it cannot be solved by the conventional aging process.

Furthermore, when there are impurities in a pixel region of the alignment layer, abnormal alignment also occurs because of the impurities in the adjacent pixel regions as well as impurities in the pixel region itself. As described above, the abnormal alignment causes defects in images produced on the display.

SUMMARY OF THE INVENTION

To overcome the problems described above, preferred embodiments of the present invention provide a method of manufacturing a liquid crystal display in which non-uniform illuminance, which is caused by impurities or non-uniform alignment of one or more alignment layers, is prevented from occurring in the display.

In preferred embodiments of the present invention, non-uniform illuminance is prevented from occurring in the display by forming a liquid crystal cell and heating the liquid crystal cell at a predetermined temperature. Thereafter, the liquid crystal cell is preferably quickly cooled.

According to one preferred embodiment of the present invention, a method of manufacturing a liquid crystal display apparatus includes the steps of forming a liquid crystal cell including first and second substrates, an alignment layer on at least one of the first and second substrates, a sealant for sealing the first and second substrates liquid crystal material between the two substrates, heating the liquid crystal cell and quickly cooling the liquid crystal cell.

Other features, elements and advantages of the present invention will be described in detail below with reference to preferred embodiments of the present invention and the attached drawings.

BRIEF DESCRIPTION OF THE ATTACHED DRAWINGS

DETAILED DESCRIPTION OF PREFERRED EMBODIMENTS

Figure 1:
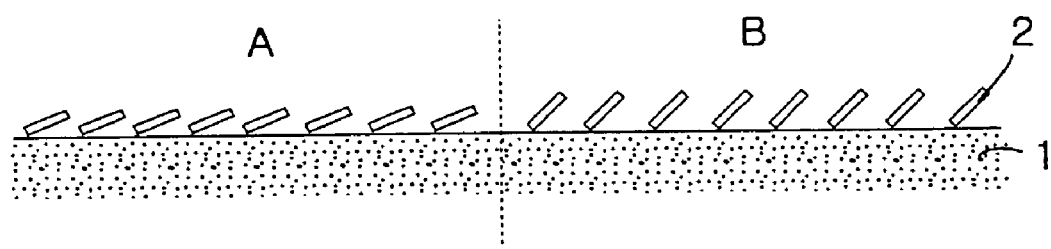
FIG. 1 is a view showing liquid crystal molecules adjacent to the surface of the alignment layer according to the related art.
Figure 2:
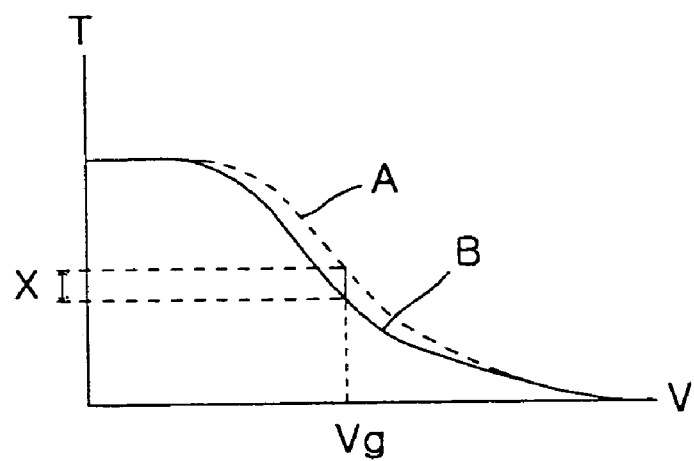
FIG. 2 is a graph showing the transmittance T as a function of the driving voltage V in the abnormally aligned region A and the normally aligned region B according to the related art.
Figure 3:
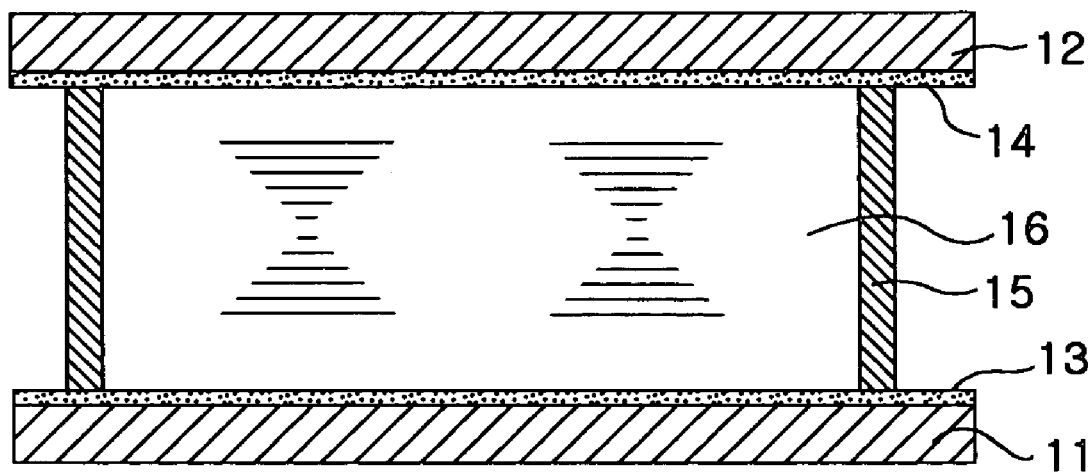
FIG. 3 is a cross-sectional view showing a method for manufacturing a liquid crystal display according to preferred embodiments of the present invention.
Figure 4:
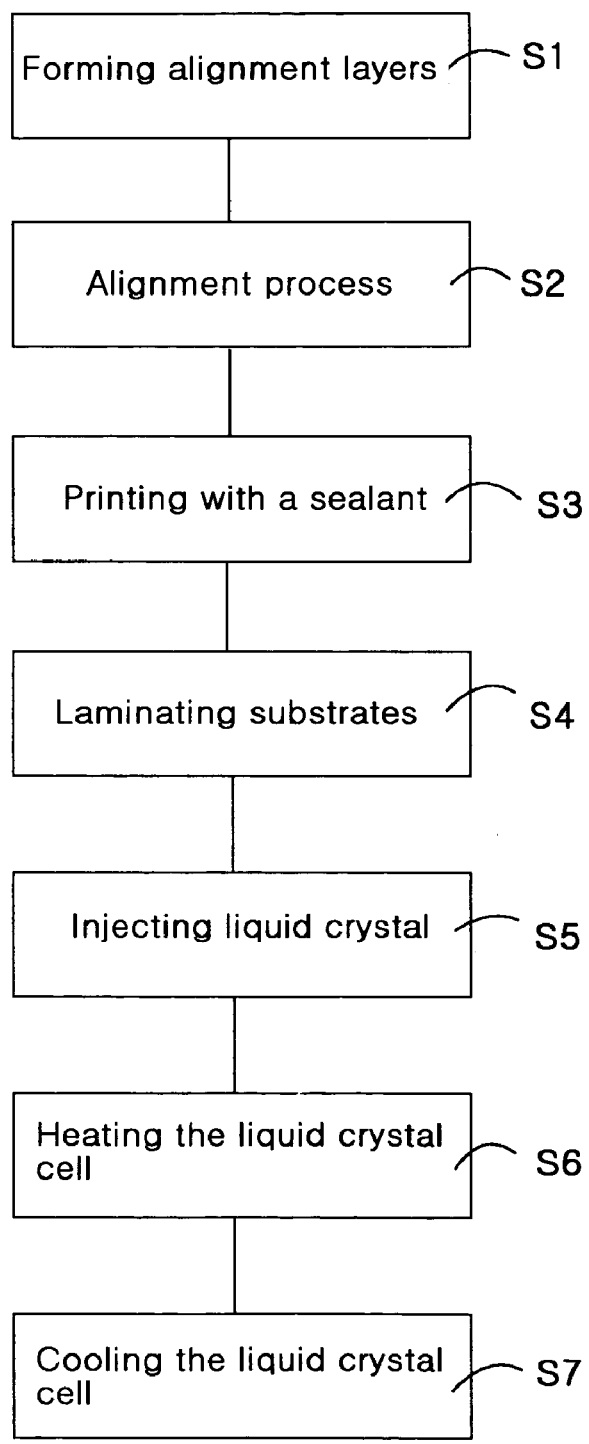
FIG. 4 is a flowchart showing a method for manufacturing a liquid crystal display according to preferred embodiments of the present invention.

FIG. 3 is a cross-sectional view showing a method of manufacturing a liquid crystal display according to preferred embodiments of the present invention. FIG. 4 is a flowchart showing a method for manufacturing a liquid crystal display according to preferred embodiments of the present invention. The method of manufacturing according to preferred embodiments of the present invention will be explained in detail with reference to FIGS. 3 and 4.

Referring to FIGS. 3 and 4, a liquid crystal display apparatus is provided with a lower substrate 11 and an upper substrate 12, first and second alignment layers 13, 14 on inner surfaces of the first and second substrates 11, 12, respectively, a sealant 15 laminating and sealing the two substrates 11, 12 together, and a liquid crystal layer 16 between the two substrates 11 and 12.

Step one S1 (see FIG. 4 for the steps S1–S7 of a preferred embodiment of the method according to the present invention) involves preferably forming the first and second alignment layers 13 and 14 by coating the first and second substrates 11 and 12 with an alignment material, preferably with polyimide or other suitable alignment material.

Step two S2 involves drying and baking the alignment layers 13 and 14 preferably prior to performing an alignment process, which is preferably performed via rubbing. Other suitable alignment processes may also be used.

Step three S3 involves printing or depositing a sealant on the substrates 11 and 12. An epoxy or other suitable sealant material is preferably deposited on the substrates 11 and 12 in this step. Thereafter, the sealant is preferably cured.

Step four S4 involves laminating the substrates 11 and 12 so that the upper substrate 12 is disposed on top of the lower substrate 11 with a gap defined between the lower substrate 11 and the upper substrate 12.

Step five S5 involves injecting liquid crystal into the gap between the two substrates 11 and 12, thus forming a liquid crystal cell.

Step six S6 involves heating the liquid crystal cell preferably in an oven.

Step seven S7 involves quickly cooling the liquid crystal cell. In this step, the LCD cell is placed in a room temperature environment so that the temperature of the LCD cell is quickly decreased or cooled to be approximately equal to room temperature. This cooling process usually requires about 30 seconds for cooling only one LCD cell and about 15–20 minutes for cooling several cells.

Note that when polyimide is used for providing the alignment layers 13 and 14, the heating process is performed at a temperature that is preferably at least above about 150° C. and the heating process preferably lasts for at least more than 30 minutes.

In another preferred embodiment, the heating process is preferably performed at a temperature above the baking temperature of polyimide, which is greater than about 170° C., and the heating process continues preferably for about an hour. Note that the sealant may be broken if the liquid crystal cell is heated at a temperature greater than the curing temperature of the sealant. Therefore, it is preferable that the heating process is performed at a temperature that is less than the curing temperature of the sealant. For example, when using a sealant having a curing temperature that is greater than about 230° C., the liquid crystal cell should preferably be heated at a temperature that is close to but less than about 230° C. Similarly, when using a conventional sealant having a curing temperature that is about 180° C., the liquid crystal cell should preferably be heated at a temperature that is close to but less than 180° C. to prevent the sealant break down.

When using a photo-alignment layer made of a material such as polysiloxane or cellulose cinnamate, it is preferable that the liquid crystal cell be quickly cooled after the heating process. The heating temperature is preferably a temperature that is about 10° C. greater than the Tni, for example, at about 100° C. if Tni is approximately 90° C.

Figure 5:
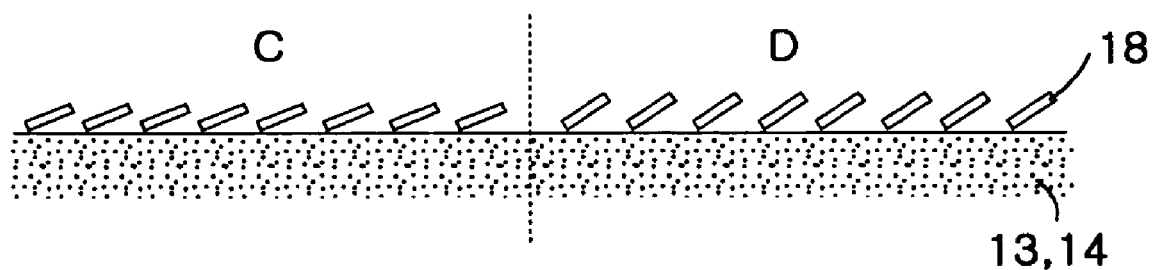
FIG. 5 is a view showing liquid crystal molecules adjacent to the surface of the alignment layer according to preferred embodiments of the present invention.

Referring to FIG. 5, when the liquid crystal cell is heated at the baking temperature of the alignment layers 13 and 14, or more than Tni, the tilt angle of the alignment layer is reduced in the whole layer. Note that the tilt angle is reduced more in the normally aligned region D than in the abnormally aligned region C. As a result, the difference in the tilt angle between the abnormally aligned region C and the normally aligned region is greatly minimized. In FIG. 5, reference numeral 18 indicates liquid crystal molecules adjacent to the alignment layers 13 or 14.

Figure 6:
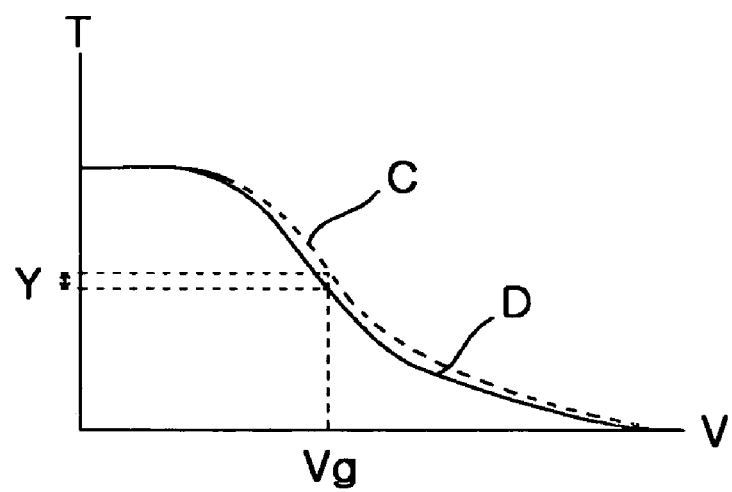
FIG. 6 is a graph showing the transmittance T as a function of the driving voltage V in the abnormally aligned region C and the normally aligned region D according to preferred embodiments of the present invention.

FIG. 6 is a graph showing the transmittance T as a function of the driving voltage V of the abnormally aligned region C and the normally aligned region D of preferred embodiments of the present invention. This graph in FIG. 6 shows that in comparison with the related background art described above, the transmittance or illuminance difference Y is greatly reduced between the abnormally aligned region C and the normally aligned region D at a grey level voltage Vg. Therefore, the non-uniform illuminance caused by the non-uniform alignment is prevented in preferred embodiments of the present invention.

In the related background art described above, impurities in the alignment layers cause abnormal alignment in adjacent pixel regions as well as in the pixel region itself. However, because the liquid crystal cell is preferably heated at the baking temperature of the alignment layer in the preferred embodiments of the present invention, the abnormal alignment caused by the impurities are repaired, thereby removing point defects in the pixel regions and preventing defective display in the liquid crystal display apparatus.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of manufacturing a liquid crystal display comprising the steps of:
   forming a liquid crystal cell including the steps of:
   providing an upper substrate and a lower substrate;
   forming an alignment layer on at least one of the upper and lower substrates, said alignment layer being formed by coating with an alignment material and baking at a baking temperature;
   forming a sealant on at least one of the upper and lower substrates;
   laminating the upper and lower substrates; and
   injecting a liquid crystal layer between the upper and lower substrates;
   heating the liquid crystal cell, wherein the heating step is performed at a heating temperature which is substantially equal to the baking temperature of the alignment layer, to form a uniform tilt angle of the alignment layer; and
   quickly cooling the liquid crystal cell.

2. The method according to claim 1, wherein the alignment layer is made of polyimide.

3. The method according to claim 2, wherein the heating temperature is above 150° C.

4. The method according to claim 3, wherein a heating time is more than 30 minutes.

5. The method according to claim 1, wherein the alignment layer is made of a photo-alignment material.

6. The method according to claim 5, wherein the photo-alignment material includes at least one of polysiloxane and cellulose cinnamate.

7. The method according to claim 1, wherein the step of sealing further comprises the step of printing at least one of the substrates with a sealant.

8. The method according to claim 1, wherein the heating temperature is less than a curing temperature of the sealant.

9. The method according to claim 1, wherein the tilt angle is reduced in the whole alignment layer.

10. A method of manufacturing a liquid crystal display comprising the steps of:
   forming a liquid crystal cell including the steps of:
      providing an upper substrate and a lower substrate;
      forming an alignment layer on at least one of the upper and lower substrates, said alignment layer being formed by coating with an alignment material and baking at a baking temperature;
      forming a sealant on at least one of the upper and lower substrates;
   laminating the upper and lower substrates; and
      injecting a liquid crystal layer between the upper and lower substrates; and
   heating the liquid crystal cell, wherein the heating step is performed at a heating temperature which is substantially equal to the baking temperature of the alignment layer, to form a uniform tilt angle of the alignment layer.

11. The method according to claim 10, wherein the heating temperature is less than a curing temperature of the sealant.

12. The method according to claim 10, wherein the alignment layer is made of polyimide.

13. The method according to claim 12, wherein the heating temperature is above 150° C.

14. The method according to claim 13, wherein a heating time is more than 30 minutes.

15. The method according to claim 10, wherein the tilt angle is reduced in the whole alignment layer.

* * * * *